United States Patent [19]

Bell

[11] 3,958,410

[45] May 25, 1976

[54] TERMINATION DEVICE FROM HAIRSPRING-HUB TO DRIVE COIL ON TWO CONDUCTOR HAIRSPRING

[75] Inventor: Harvey Maxwell Bell, Thorpe Lea, England

[73] Assignee: Timex Corporation, Waterbury, Conn.

[22] Filed: June 2, 1975

[21] Appl. No.: 583,349

[52] U.S. Cl. .................................. 58/107; 58/28 B; 58/114; 310/36

[51] Int. Cl.² ..................... G04B 17/06; G04C 3/04; H02K 33/02

[58] Field of Search .................. 58/28 R, 28 B, 107, 58/114; 310/36

[56] References Cited

UNITED STATES PATENTS 3,553,956 1/1971 Schwartz et al..................... 58/28 R

*Primary Examiner*—Edith Simmons Jackmon

[57] ABSTRACT

The termination arrangement comprises a two conductor hairspring and/or hub arrangement in an electric watch for coupling drive pulses to a balance wheel drive coil. A metallic hairspring, which is fastened to the hub, has a conductor which is insulated from the hub and balance wheel staff or arbor. A contact - metallic washer like - member is bonded to the hairspring collet such that the contact member is electrically insulated from the hairspring colet. The contact member is, also, electrically connected with one end of the second conductor on the hairspring. And a helical type spring-conductor having less than one full turn in length is bonded to the balance wheel between the hairspring-hub arrangement and the contact member. The helical type spring at the end which is bonded to the balance wheel is electrically connected to one end of the balance wheel drive coil. The other end of the spring-conductor is maintained in electrical contact with the contact-washer member by the pressure of the spring.

In this manner, a termination arrangement is provided for a two conductor hairspring and/or hub arrangement in an electrical watch which is capable of coupling drive pulses to a balance wheel drive coil and which facilitates the removal and setting of the hairspring or balance wheel by automatically making electrical contact without requiring soldering, etc.

6 Claims, 5 Drawing Figures

TERMINATION DEVICE FROM HAIRSPRING-HUB TO DRIVE COIL ON TWO CONDUCTOR HAIRSPRING

FIELD OF THE INVENTION

Figure 1:
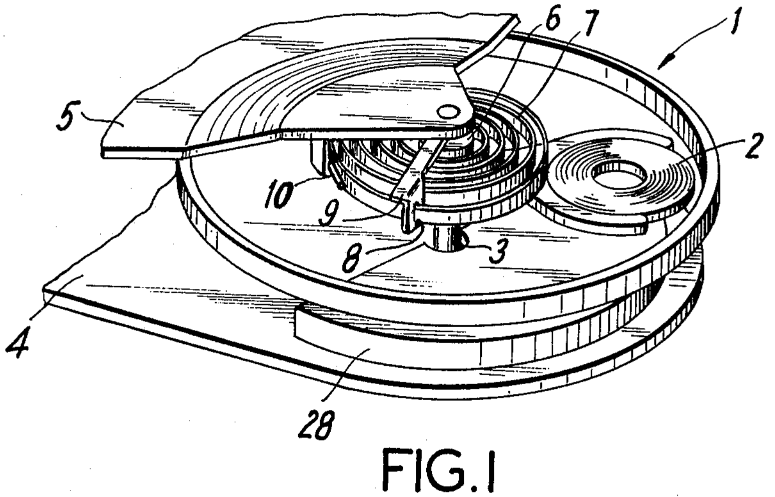

This invention relates to electric or electronic watches and in particular to a current conductive hairspring arrangement having an improved termination device.

BACKGROUND OF THE INVENTION

With the emergence of the electric or electronic watch having a balance wheel as its main or central timekeeping element actuated by a drive coil mounted thereon, an inexpensive and reliable arrangement is needed to electrically connect the oscillating drive coil to the electric watch drive and/or synchronizing circuitry.

A known arrangement to connect the drive coil to the electric watch drive circuitry is described in German Patent No. 1,078,677 issued Sept. 22, 1960 to Ewald Zemla. In this arrangement, the hairspring consists of three flat layers, i.e. two electrically conductive strips with an insulation strip therebetween. The hub consists of an insulating bushing, which is slipped onto the balance wheel arbor or staff, and two metallic ring halves surrounding the insulating bushing. The ring halves form a slot to receive one end of the hairspring, whereby its conductor strips are each connected to a ring half of the hub. The obvious disadvantages of this known arrangement are that it requires a complicated and expensive hub construction and that great care must be taken when fastening the hairspring in the hub so that the conductor strips do not suffer damage and that unsoldering and soldering is required to replace, set, or repair the hairspring or balance wheel.

The prior art also includes U.S. Pat. No. 3,332,229 to Klinck and U.S. Pat. No. 3,553,956 issued Jan. 12, 1971 to Schwartz, Wurmberg and Weise. The above-mentioned patents are mentioned as being representative of the prior art only and other pertinent patents may exist. None of the above cited patents are deemed to affect the patentability of the present invention.

It is an objective of the present invention to provide a termination arrangement or device for a two conductor hairspring and/or hub arrangement, which arrangement or device will be relatively low in cost, will utilize relatively few parts and will facilitate the removal and setting of the hairspring without the need for soldering.

Further advantages and objectives of the present invention will be apparent from the following detailed description of the preferred embodiment of the invention.

SUMMARY OF THE INVENTION

A termination or electrical coupling arrangement for a two conductor hairspring and/or hub arrangement in an electric watch of the type having a hairspring fastened at an inner end to a hub, wherein the improvement comprises a two conductor hairspring being fastened to the hub, said hairspring having at least one conductor in the area of said hub which is electrically insulated from the hub; a spring-conductor disposed between the balance wheel and the hairspring being in electrical contact with the hairspring conductor and a balance wheel drive coil, the electrical connection at least between the spring and the hairspring conductor being maintained by the pressure of the spring.

The accompanying drawings diagrammatically illustrate an embodiment of the present invention by way of example. Like numerals refer to like parts throughout.

FIG. 1 is a perspective view of a part of an electric wristwatch having a balance wheel and hairspring arrangement.

Figure 2:
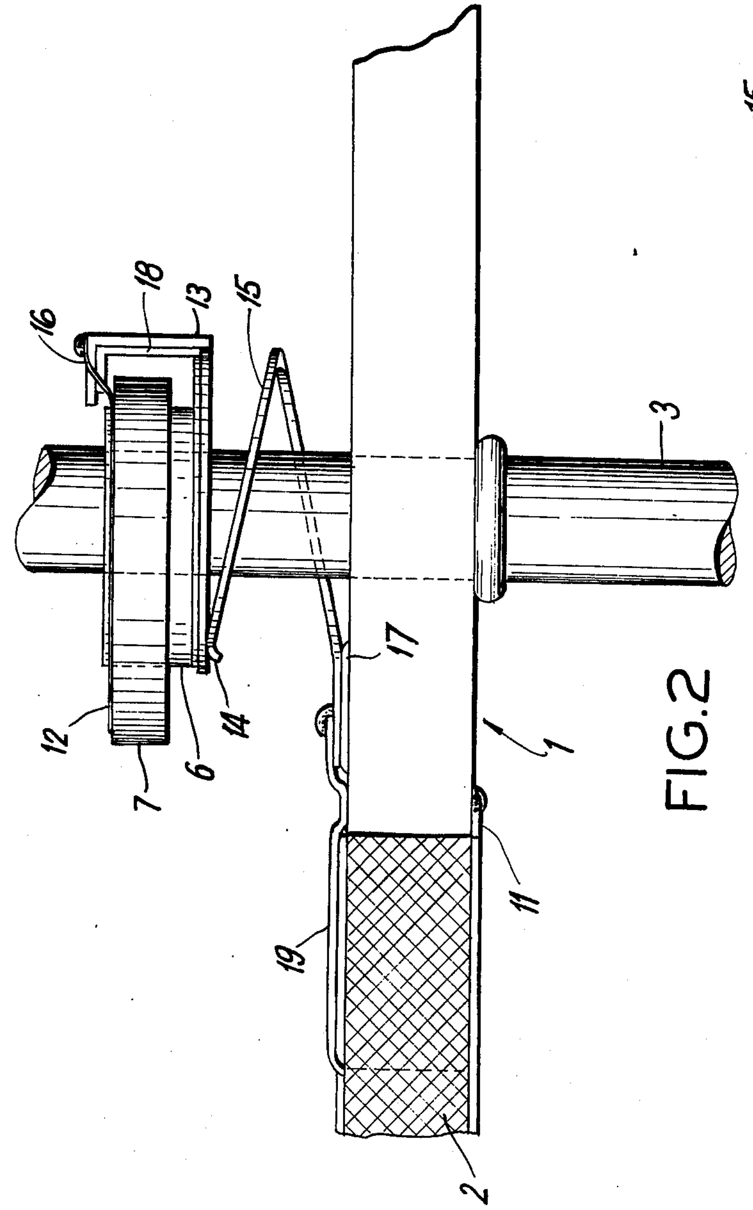
Figure 2B:
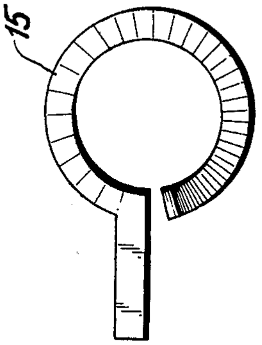
Figure 2A:
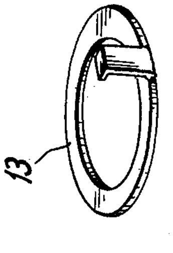

FIGS. 2 2*a*, and 2*b* are an axial cross-sectional views of a preferred construction of the termination and coupling arrangement according to the invention, and perspective views of the contact tab washer and helical spring conductor respectively.

Figure 3:
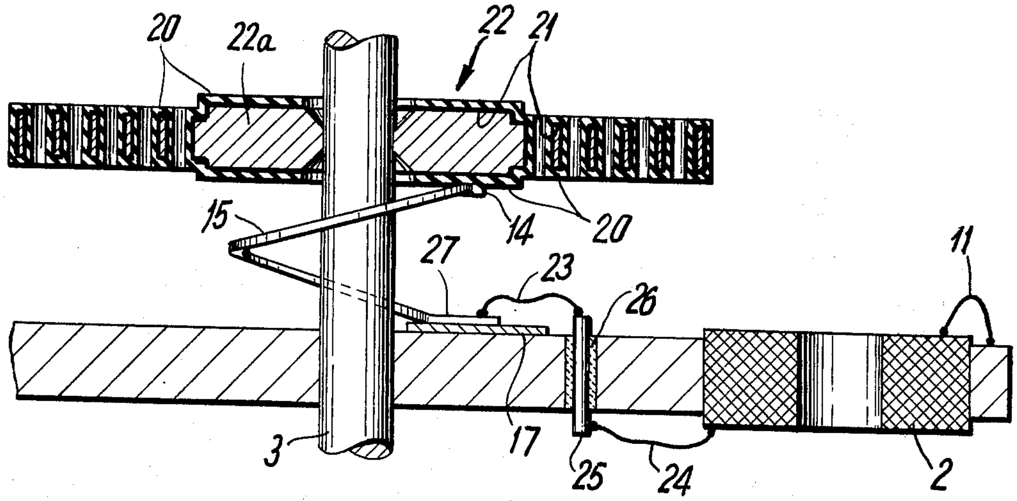

FIG. 3 is an axial cross-sectional view of an alternative construction for electrically connecting a conductor of the hairspring to the balance wheel drive coil.

Referring now to FIG. 1, the pertinent part of an electric wristwatch for purposes of illustrating the present invention is shown. The balance wheel unit 1, which includes an electric coil 2, is affixed to an arbor or staff 3. The staff 3 is rotatably mounted between the front frame 4 and a bridge member 5. The staff 3 has affixed thereto a so-called hairspring hub 6, to which the inner end of the hairspring 7 is fastened. The hairspring 7 is passed through an opening 8 of a so-called regulator 9, which is rotatably mounted with respect to the bridge member 5 and coaxially to the staff 3. The outer end of the hairspring is fastened 10 to the bridge member 5 in a conventional manner. The electric coil 2 which cooperates with a permanent magnet 28 fastened on the front frame 4, functions conventionally to provide the drive and/or synchronizing force to the balance wheel unit 1 and, therefore, is not described further to avoid prolixity.

Reference will now be made to FIG. 2 which shows in an axial cross-sectional view an embodiment of the present invention. The hub 6 has the inner end of the hairspring 7 fastened thereto. The hairspring 7 is a conventional or common metal hairspring, and, for example, by inserting it into a slot of the hub 6 and deforming the sidewalls of the slot is clamped or attached to the hub 6. A two conductor hairspring arrangement of this type is described in U.S. patent application Ser. No. 552,469 filed Feb. 24, 1975 in the name of inventor Wilhelm Tilse and assigned to the same assignee as this application.

The hairspring 7 is provided with or carries on a longitudinal edge an electric conductor 12. The electrical conductor 12 is affixed to the longitudinal edge of the hairspring 7 by means of, for example, an insulating adhesive so that the electrical conductor 12 is insulated from the hairspring 7. A termination block or contact tab washer 13 which is shown in more detail in FIG. 2a is mounted on or affixed to the hub 6. The contact tab washer 13 is in electrical contact with the spring or termination device 15 which is shown in more detail in FIG. 2b and a conductor wire 16. The conductor wire 16, electrically connects the hairspring conductor 12 to the conductor tab washer 13. The contact tab washer 13 is bonded or affixed to the hub 6 by means of, for example, an insulating adhesive 18 and is, therefore, electrically insulated from the hub 6. The spring-conductor 15 is electrically connected to one end of the drive coil 2 by means of a conductor 19. The other end of the drive coil is connected to ground or reference potential via conductor 11 and the balance wheel. The spring 15 is bonded or affixed to the balance wheel 1 by means of, for example, an insulating adhesive 17 to hold the spring in place. Electrical contact or connection between the spring 15 and the contact tab washer 13 is maintained by the pressure of the spring 15 against the contact tub washer 13 at a contact point 14. The contact points or surfaces can be gold plated to ensure low contact resistance.

Reference will now be made to FIG. 3 which shows in an axial cross sectional view an alternative embodiment of the invention. The two conductor hairspring arrangement shown is similar to that described in U.S. patent applicaton Ser. No. 522,569 filed Feb. 24, 1975 and assigned to this assignee. The construction or arrangement differs, however, in that electrical connection is made directly to the outer conductor 20 means of a helical type contact spring 15 in the area of the hub 22. Thus, since the hub and hairspring are coated or sheated with an outer electrical conductor 20 which is insulated from the inner conductor 22a by means of an insulation coating 21, the contact spring 15 makes electrical contact at contact point 14 directly to the outer conductor 20 of the hairspring-hub arrangment. In this embodiment, therefore, no contact tab washer is required. The spring 15 is electrically connected to one end of the balance wheel drive coil 2 via conductor wire 23, 24 and conductor pin 25. The conductor pin 25 is insulated from the balance wheel mass by insulating means 26. The spring 15, therefore, when inserted, makes electrical contact 14 under spring pressure to the outer conductor 20 of the two conductor hairspring-hub arrangement. The other end of the spring 15 is bonded to the balance wheel 1 by any suitable insulating means 17. The end 27 of the spring being bonded to the balance wheel 1 is formed such that it will lie flat with respect to the balance wheel to thereby provide a bonding surface between the spring 15 and the balance wheel 1. The other end of the drive coil 2 is connected to the balance wheel 1 via conductor 11. In this manner. the contact spring can be removed, replaced or adjusted without the necessity for soldering connections which simplifies manufacturing, lowers cost and simplifies adjustment and replacement of the hairspring and/or hub arrangement.

I claim:

1. A termination arrangement for two conductor hairspring for coupling drive pulses to a balance wheel drive coil in an electric watch of the kind having a hairspring fastened at an inner end to a hub, a hairspring conductor being electrically insulated from the hub and electrically coupled to an end of a drive coil mounted on a balance wheel, wherein the improvement comprises.

means forming an electrically conductive contact member for being affixed to said hub and electrically insulated from said hub and electrically connected to said hairspring conductor;

a spring-conductor means being affixed to said balance wheel and electrically insulated from said balance wheel and electrically connected to said drive coil for providing electrical contact by spring pressure with at least said contact member.

2. A termination arrangement in an electric watch as in claim 1, wherein:

the spring-conductor means comprises a helical spring having less than one full turn in length.

3. A termination arrangement in an electric watch as in claim 1, wherein:

the hairspring conductor being affixed to a longitudinal edge of the hairspring by an insulating adhesive.

4. A termination arrangement for a two conductor hairspring for coupling drive pulses to a balance wheel drive coil in an electric watch of the kind having a hairspring fastened at an inner end to a hub, a hairspring conductor being electrically insulated from the hub and electrically coupled to an end of a drive coil mounted on a balance wheel, wherein the improvement comprises:

a spring-conductor means being affixed to said balance wheel and electrically insulated from said balance wheel and electrically connected to said drive coil for making electrical connection by spring pressure to said hairspring conductor.

5. A termination arrangement in an electric watch as in claim 4, wherein:

the hairspring being fastened at an inner end to the hub comprises a inner conductor of a two conductor hairspring-hub arrangement, said hairspring-hub arrangement having an outer conductor which is insulated from said inner conductor;

the spring-conductor means being in electrical contact by spring pressure with said outer conductor and electrically connected to said drive coil.

6. A electrical connection arrangement in an electric watch comprising:

a hub;

a hairspring being attached at one end to said hub;

means forming an electric conductor affixed on a longitudinal edge of said hairspring and for electrically insulating said electric conductor from said hairspring;

a balance wheel having a drive coil affixed thereto;

means forming an electric conductor contact surface affixed on said hub and for electrically insulating said electric conductor contact surface from said hub;

electric conductor means for electrically connecting said electric conductor contact surface with said hairspring conductor;

means forming a spring-conductor electrically connected at an end to said drive coil affixed to said balance wheel and for maintaining electric contact with said means forming an electric conductor contact surface by spring pressure at the other end of said spring-conductor.

* * * * *